United States Patent
Blum et al.

(10) Patent No.: US 6,825,241 B1
(45) Date of Patent: Nov. 30, 2004

(54) SOLID CONTAINING GROUPS WHICH ARE BOUND TO THE BASE STRUCTURE VIA UREATHANE GROUPS AND WHICH CONTAIN BONDS THAT CAN BE ACTIVATED BY ACTINIC RADIATION, AND THE USE THEREOF

(75) Inventors: Rainer Blum, Ludwigshafen (DE); Reinhold Schwalm, Wachenheim (DE); Rainer Königer, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 156 days.

(21) Appl. No.: 10/089,171

(22) PCT Filed: Oct. 1, 2000

(86) PCT No.: PCT/EP00/09625

§ 371 (c)(1),
(2), (4) Date: Mar. 27, 2002

(87) PCT Pub. No.: WO01/25359

PCT Pub. Date: Apr. 12, 2001

(30) Foreign Application Priority Data

Oct. 2, 1999 (DE) .......................................... 199 47 523

(51) Int. Cl.$^7$ .............................. C08F 2/46; C08F 8/30
(52) U.S. Cl. ......................... 522/96; 522/109; 522/110; 522/111; 522/112; 522/90; 522/97; 525/127; 525/131; 525/450; 525/451; 525/454; 525/455; 525/293; 525/298; 525/301; 428/423.1; 428/522

(58) Field of Search .................................. 525/293, 298, 525/301, 127, 131, 450, 451, 454, 455; 428/423.1, 522; 522/97, 109, 110, 111, 112, 90, 96

(56) References Cited

U.S. PATENT DOCUMENTS 4,017,371 A * 4/1977 Morgan ....................... 522/97

* cited by examiner

Primary Examiner—James J. Seidleck
Assistant Examiner—Sanza L. McClendon
(74) Attorney, Agent, or Firm—Keil & Weinkauf

(57) ABSTRACT

Solids containing (i) on average per molecule at least two groups (a) having at least one bond which can be activated with actinic radiation whereby the groups (a) are structurally different from one another and are attached to the parent structure of the solid via urethane groups, or containing (ii) on average per molecule more than one group (a) having at least one bond which can be activated with actinic radiation, the groups being structurally different from one another or the same and being attached to the parent structure of the solid via urethane groups, and from 0.01 to 1 mol %, based on the bonds present which can be activated with actinic radiation, of at least one chemically bonded polymerization inhibitor (b), preparable by reacting the starting products in the melt; use of the solids as coating materials, adhesives or sealing compounds or for preparing them; coating materials, adhesives or sealing compounds preparable using the solids; and coatings, adhesive films or seals producible from the coating materials, adhesives or sealing compounds.

30 Claims, No Drawings

SOLID CONTAINING GROUPS WHICH ARE BOUND TO THE BASE STRUCTURE VIA UREATHANE GROUPS AND WHICH CONTAIN BONDS THAT CAN BE ACTIVATED BY ACTINIC RADIATION, AND THE USE THEREOF

The present invention relates to novel solids containing groups which are attached to the parent structure via urethane groups and which contain bonds which can be activated with actinic radiation. The present invention also relates to a novel process for preparing the novel solids. The present invention additionally relates to novel coating materials, adhesives or sealing compounds which can be prepared using the novel solids. The present invention relates, furthermore, to a novel process for producing novel coatings, adhesive films, and seals on primed or unprimed substrates, using the novel coating materials, adhesives or sealing compounds. The present invention relates not least to novel primed or unprimed substrates which comprise novel coatings, adhesives and/or seals.

The coating or painting of primed or unprimed substrates with solid pulverulent coating materials, adhesives and/or sealing compounds which can be cured with actinic radiation is attracting more and more interest. The reason for this are advantages anticipated in terms of surface smoothness and the reduced thermal load on the substrates, which arise from the separation of the melting process and curing reaction as compared with coating materials, adhesives and sealing compounds which are curable by means of heat alone.

Here and below, actinic radiation means electromagnetic radiation such as X-rays, UV radiation, visible light or near IR light (NIR) or corpuscular radiation such as electron beams.

In the practical development of solid pulverulent coating materials, adhesives and/or sealing compounds curable with actinic radiation, especially powder coating materials, however, a number of problems arise.

The principal problem, especially in the case of radically curable systems based on (meth)acrylate-functionalized polyurethanes, which are particularly attractive from a performance standpoint, is the premature heat-initiated polymerization. This thermal polymerization leads to problems in the working up of the solids into powder coating materials, for which, usually, multiple melting procedures are required. Even less attractive is the premature thermal polymerization that occurs when melting the powder coating materials onto the substrates, before irradiating them with actinic radiation. The fundamental advantage of heat-curable powder coating materials, especially with regard to surface smoothness, that results from the separation of melting process from curing reaction, cannot be realized in this case.

The unwanted premature thermal polymerization may be prevented by adding sufficient amounts of polymerization inhibitors such as phenothiazine or hydroquinone; at the same time, however, the reactivity on exposure to actinic radiation is reduced to such an extent that the resulting exposure times were so long as to be of no industrial interest.

Further problems arise from the requirement for blocking resistance and low melting temperature of the solid radiation-curable powder coating materials, low viscosity of the melts, and good elasticity in the coatings. In the context of these problems, there exist multiple divergent functions: (meth)acrylate-functionalized polyurethanes with a low melting temperature and low melt viscosity are usually crystalline monomeric compounds or very low molecular mass, oligomeric solids, which after crosslinking give rise to brittle films and coatings. (Meth)acrylate-functionalized polyurethanes of higher molecular mass normally give more elastic films that, however, have high melting temperatures and form highly viscous melts, which reduces the surface smoothness.

Moreover, the preparation of the (meth)acrylate-functionalized polyurethanes is comparatively complex and therefore expensive. In addition, the radiation-curable powder coating materials known to date leave something to be desired in terms of the scratch resistance, chemical resistance, and weathering stability of the coatings produced from them.

This also applies, mutatis mutandis, to the adhesives and sealing compounds.

Because of their economic and technological attractiveness, there has been no lack of attempts to develop the radiation-curable powder coating materials further.

For instance, the German patent application DE-A-24 36 186 or the U.S. Pat. No. 3,974,303 describe pulverulent and thermoplastic polymers which contain from 0.5 to 3.5 polymerizable unsaturated double bonds per 1000 molar weight, and their use as radiation-curable binders. Described specifically is a (meth)acrylate-functionalized polyurethane prepared in the melt from tolylene diisocyanate, 2-hydroxyethyl methacrylate, and trimethylolpropane in a molar ratio of 3:3:1. The (meth)acrylate-functionalized polyurethane has a melting point of around 65° C. and a polymerizable double bond content of 2.9 double bonds per 1000 molecular weight. No details, however, are given concerning the stability of the melt. The polyurethane can be used per se as an actinic radiation curable powder coating material. No details are given regarding the stability or mechanical quality of the coatings produced using it. Because of the high level of aromatic structures it contains, however, it is likely that the coatings produced from it are not stable to weathering but instead tend toward yellowing under the effect of sunlight.

The European patent application EP-A-0 636 669 describes mixtures of unsaturated polyesters or (meth)acrylate-functionalized polyacrylates, the poly-acrylates being obtained in a conventional poly-merization, and polyurethane crosslinking agents functionalized with vinyl ethers or (meth)acrylic esters. The examples disclose only mixtures of polyesters and vinyl ether urethanes. The vinyl ether urethanes are prepared in chloroform as solvent. No teaching is given on preparing olefinically unsaturated polyurethanes for overcoming the complex problems indicated above in the context of developing technically usable radiation-curable powder coating materials.

The European patent application EP-A-0 410 242 discloses polyurethanes containing (meth)acryloyl groups in an amount corresponding to from 3 to 10% by weight, based on the polyurethane, of =C=C= (molecular weight 24). These known polyurethanes have melting points or melting ranges in the temperature range from 50 to 180° C. (no further details are given). They are prepared using isophorone diisocyanate, 4,4'-diisocyanatodicyclohexylmethane, 4,4'-diisocyanatodi-phenylmethane, its technical-grade mixtures with 2,4-diisocyanatodiphenylmethane, and, where appropriate, the higher homologues of these diisocyanates, 2,4-diisocyanatotoluene and its technical-grade mixtures with 2,6-diisocyanatotoluene (tolylene diisocyanate), and also biuret-, isocyanurate- or urethane-modified polyisocyanates based on these simple polyisocyanates. As far as the polyurethanes based on aromatic polyisocyanates are concerned, the above comments apply. Besides this, it is difficult to use these polyisocyanates as a basis for preparing polyurethanes which have a particularly narrow melting range, let alone a defined melting point. In particular, the use of polyisocyanates having an average functionality >2 leads to polyurethanes with an undesirably broad molecular weight distribution, making them of only limited usefulness in radiation-curable powder coating materials. Admittedly, some of the polyurethanes specified in the examples begin to soften at practicable temperatures of 85–95° C.; as a result of their high level of branching, however, the melt viscosity at these temperatures is too high for them to be used in radiation-curable powder coating materials. Furthermore, the polyurethanes are prepared in ethyl acetate as solvent, after which the solvent must be evaporated in vacuo at low temperatures. No details are given of stabilizing against premature thermal crosslinking of the melts without adversely affecting the reactivity on radiation-curing. A teaching to solve the above-described further complex problems in the development of technically usable radiation-curable powder coating materials is not given.

The European patent EP-A-0 783 534 discloses (meth)acrylate-functionalized polyurethanes obtained using as well monofunctional hydroxy compounds without unsaturated groups. Although this lowers the viscosity, these nonreactive terminal groups reduce the reactivity on curing with actinic radiation. The desire, however, is for coatings crosslinked thermally using peroxides. No details are given of stabilizing against premature thermal crosslinking without adversely affecting the reactivity on radiation curing. A teaching to solve the above-described further complex problems in the development of technically usable UV powder coating material systems is not given.

It is an object of the present invention to provide novel solids containing groups which are attached to the parent structure via urethane groups and which contain bonds which can be activated with actinic radiation, and which no longer have the disadvantages of the prior art but instead can be prepared simply in he melt, melt at comparatively low temperatures, are stable in the melt and have a low melt viscosity, do not tend toward premature thermal crosslinking, exhibit a high level of reactivity on curing with actinic radiation, do not block in powder form but instead flow freely, and are extremely suitable for the preparation of novel, particularly pulverulent, coating materials, adhesives, and sealing compounds; the novel coating materials, adhesives, and sealing compounds ought to give coatings, adhesives, and seals which are intended to have a high level of hardness, elasticity, scratch resistance, chemical resistance, weathering stability, and the coatings in particular, especially the surface coating systems, are intended to have a very smooth surface and a very good overall appearance.

The invention accordingly provides the novel solid containing on average per molecule at least two groups (a) having at least one bond which can be activated with actinic radiation, the groups being structurally different from one another and being attached to the parent structure of the solid via urethane groups.

The invention also provides the novel solid containing
(a) on average per molecule more than one group having at least one bond which can be activated with actinic radiation, the groups being structurally different from one another or the same and being attached to the parent structure of the solid via urethane groups, and
(b) from 0.01 to 1 mol %, based on the bonds present which can be activated with actinic radiation, of at least one chemically bonded stabilizer, preparable by reacting the starting products in the melt.

In the text below, the novel solids are referred to collectively as "solids of the invention".

The invention also provides the novel coating materials, adhesives, and sealing compounds which are prepared with the aid of the solids of the invention and are referred to below as "coating materials, adhesives, and sealing compounds of the invention".

The invention additionally provides the novel process for producing coatings, adhesive films or seals for primed or unprimed substrates, wherein
(1) at least one coating material and/or adhesive and/or sealing compound of the invention in the form of
   (1.1) a melt,
   (1.2) a powder,
   (1.3) a powder slurry or
   (1.4) a dispersion or a solution in at least one organic solvent
   is applied to the primed or unprimed substrate,
(2) the resulting powder slurry film (1.3) or the resulting film of a dispersion or a solution (1.4) is dried or the resulting film of the melt (1.1) is caused to solidify or is maintained in the melted state by heating,
(3) the resulting solid film (1.2), (1.3) or (1.4) is melted by heating, and
(4) the melted film which results in process step (2) or (3),
   (4.1) in the melted state,
   (4.2) on solidification and/or
   (4.3) after solidification,
   is cured with actinic radiation.

In the text below, the novel process for producing coatings, adhesive films, and seals for primed or unprimed substrates from the coating materials, adhesives, and sealing compounds of the invention is referred to as the "process of the invention".

The invention further provides the novel coatings, adhesive films, and sealing compounds produced by means of the coating materials, adhesives, and sealing compounds of the invention and/or by the process of the invention, and referred to below as "coatings, adhesive films, and sealing compounds of the invention".

The invention relates not least to the novel primed or unprimed substrates which have at least one coating, adhesive film and/or seal of the invention and are referred to collectively below as "substrates of the invention".

Further subject matter of the invention will emerge from the following description.

The solid of the invention contains per molecule on average, in a first variant according to the invention, at least two groups (a) having at least one bond which can be activated with actinic radiation.

For the purposes of the present invention, a bond which can be activated with actinic radiation is a bond which on exposure to actinic radiation becomes reactive and, together with other activated bonds of its kind, undergoes polymerization reactions and/or crosslinking reactions which proceed in accordance with radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the inventively preferred group (a) contains one double bond or two, three or four double bonds. Where more than one double bond is used, the double bonds may be conjugated. In accordance with the invention, however, it is of advantage if the double bonds are present in isolation, in particular each terminally, in the group (a). It is of particular advantage in accordance with the invention to use two, in particular one, double bond.

The solid of the invention further contains on average two or more groups (a). This means that the functionality of the solid of the invention is integral, i.e., is for example two, three, four, five or more, or nonintegral, i.e., is for example from 2.1 to 10.5 or more. Which functionality is chosen depends, on the one hand, on the stoichiometric proportions of the starting products of the solid of the invention, which, on the other hand, depend in turn on its intended applications. Evident here is a further particular advantage of the solid of the invention: that it can be varied extremely widely in its composition and so easily adapted to the requirements of the particular intended application.

Inventively, the at least two groups (a) are structurally different from one another. This means for the purposes of the present invention that two, three, four or more, but in particular two, groups (a) are used which are derived from two, three, four or more, but especially two, monomer classes.

Examples of suitable groups (a) are (meth)acrylate, ethacrylate, crotonate, cinnamate, vinyl ether, vinyl ester, dicyclopentadienyl, norbornenyl, isoprenyl, isopropenyl, allyl or butenyl groups; dicyclo-pentadienyl ether, norbornenyl ether, isoprenyl ether, isopropenyl ether, allyl ether or butenyl ether groups, or dicyclopentadienyl ester, norbornenyl ester, isoprenyl ester, isopropenyl ester, allyl ester or butenyl ester groups.

Accordingly, the solid of the invention contains a combination of two, three, four or more, but especially two, of the abovementioned groups (a), for example

- (meth)acrylate groups and ethacrylate, crotonate, cinnamate, vinyl ether, vinyl ester, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether and/or butenyl ether groups, and/or dicyclopentadienyl ester, norbornenyl ester, isoprenyl ester, isopropenyl ester, allyl ester and/or butenyl ester groups;
- cinnamate groups and (meth)acrylate, ethacrylate, crotonate, vinyl ether, vinyl ester, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether and/or butenyl ether groups, and/or dicyclopentadienyl ester, norbornenyl ester, isoprenyl ester, isopropenyl ester, allyl ester and/or butenyl ester groups;
- vinyl ether groups and (meth)acrylate, ethacrylate, crotonate, cinnamate, vinyl ester, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether and/or butenyl ether groups, and/or dicyclopentadienyl ester, norbornenyl ester, isoprenyl ester, isopropenyl ester, allyl ester and/or butenyl ester groups; or
- allyl groups and (meth)acrylate, ethacrylate, crotonate, cinnamate, vinyl ether, vinyl ester, dicyclopentadienyl, norbornenyl, isoprenyl, isopropenyl, and/or butenyl groups; dicyclopentadienyl ether, norbornenyl ether, isoprenyl ether, isopropenyl ether, allyl ether and/or butenyl ether groups, and/or dicyclopentadienyl ester, norbornenyl ester, isoprenyl ester, isopropenyl ester, allyl ester and/or butenyl ester groups.

In accordance with the invention, the combinations of the (meth)acrylate group, especially the acrylate group, with at least one, especially one, other kind of groups (a) are of advantage and are therefore used with preference.

The groups (a) are attached via urethane groups to the parent structure of the solid of the invention. The following two linking structures I and II come into consideration for this purpose:

parent structure-NE—C(O)—O-group (a) (I) and parent structure-O—(O)C—NH-group (a) (II).

The solid of the invention may contain both linking tructures I and II or only one of them. In general, the structure I is of advantage, owing to the large number of starting materials available and their comparatively greater ease of preparation, and is therefore employed with preference in accordance with the invention.

The groups (a) are attached terminally and/or laterally to the parent structure. Which type of attachment is chosen depends in particular on whether the functional groups are present terminally or laterally in the parent structure with which the starting products of the groups (a) are able to react. In many cases, terminal groups (a) are more reactive than lateral groups (a), owing to the absence of steric shielding, and are therefore used with preference. On the other hand, however, the reactivity of the solid of the invention may be specifically controlled by way of the ratio of terminal to lateral groups (a), which is a further particular advantage of the solid of the invention.

The parent structure of the solid of the invention is of low molecular mass, oligomeric and/or polymeric. That is to say that the solid of the invention is a low molecular mass compound, an oligomer or a polymer. Or else the solid of the invention comprises low molecular ass and oligomeric, low molecular mass and polymeric, ligomeric and polymeric, or low molecular mass, ligomeric and polymeric parent structures; in other words, it is a mixture of low molecular mass compounds and oligomers, of low molecular mass compounds and polymers, of oligomers and polymers, or of low molecular mass compounds, oligomers and polymers.

For the purposes of the present invention, oligomers are resins whose molecule contains at least 2 to 15 repeating monomer units. For the purposes of the present invention, polymers are resins which contain at least 10 repeating monomer units in their molecule. For further details of these terms, refer to Römpp Lexikon Lacke und Druckfarben, Georg Thieme Verlag, Stuttgart, New York., 1998, "oligomers", page 425.

The low molecular mass, oligomeric or polymeric parent structure comprises or consists of aromatic, cycloaliphatic and/or aliphatic structures or building blocks. It preferably comprises or consists of cycloaliphatic or aliphatic structures, especially cycloaliphatic and aliphatic structures.

Examples of suitable aromatic structures are aromatic and heteroaromatic rings, especially benzene rings.

Examples of cycloaliphatic structures are cyclobutane, cyclopentane, cyclohexane, cycloheptane, norbornane, camphane, cyclooctane or tricyclodecane rings, especially cyclohexane rings.

Examples of aliphatic structures are linear or branched alkyl chains having from 2 to 20 carbon atoms, or chains as result from the (co)polymerization of olefinically unsaturated monomers.

The parent structure, especially the oligomeric and/or polymeric parent structure, may also contain olefinically unsaturated double bonds.

The parent structure, especially the oligomeric and/or polymeric parent structure, is of linear, branched, hyper-branched or dendrimeric structure.

It may contain polyvalent, especially divalent, functional groups (c) by means of which the above-described structures or building blocks are linked with one another to form the parent structure. These groups are generally selected so as not to disrupt, let alone prevent completely, the reactions initiated thermally and/or by actinic radiation. Examples of suitable functional groups are ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone, sulfoxide or siloxane groups. Of these groups, the ether, carboxylate, carbonate, carboxamide, urea, urethane, imide and carbonate groups, especially the carboxylate and the urethane groups, are of advantage and are therefore used with preference.

Advantageous oligomeric and polymeric parent structures are therefore derived from random, alternating and/or block, linear, branched, hyperbranched, dendrimeric and/or comb addition (co)polymers of ethylenically unsaturated monomers, polyaddition resins and/or polycondensation resins. For further details of these terms, refer to Römpp Lexikon Lacke und Druckfarben, Georg Thieme Verlag, Stuttgart, New York, 1998, page 457, "polyaddition" and "polyaddition resins (polyadducts)", and also pages 463 and 464, "polycondensates", "polycondensation", and "polycondensation resins".

Examples of highly suitable addition (co)polymers are poly(meth)acrylates and partially hydrolyzed polyvinyl esters.

Examples of highly suitable polyaddition resins and/or polycondensation resins are polyesters, alkyds, polyurethanes, polyester-polyurethanes, polylactones, polycarbonates, polyethers, polyester-polyethers, epoxy resin-amine adducts, polyureas, polyamides or polyimides. Of these, the polyesters, polyester-polyethers, polyurethanes, and polyester-polyurethanes are particularly advantageous and are therefore used with very particular preference in accordance with the invention.

The parent structure may further comprise chemically bonded photoinitiator's and/or photocoinitiators (d) Examples of suitable chemically bonded photoinitiators are those of the Norrish or type, whose mechanism of action is based on an intramolecular variant of the hydrogen abstraction reactions such as occur diversely in photochemical reactions (by way of example, refer here to Römpp Chemie Lexikon, 9th, expanded and revised edition, Georg Thieme Verlag Stuttgart, Volume 4, 1991) or cationic photoinitiators (by way of example, refer here to Römpp Lexikon Lacke und Druckfarben, Georg Thieme Verlag Stuttgart, 1998, pages 444 to 446), especially benzophenones, benzoins or benzoin ethers or phosphine oxides. One example of a suitable photoco-initiator is anthracene. If the chemically bonded photoinitiators and/or photocoinitiators (d) are used as well, they are present in the solid of the invention in an amount corresponding to on average from 0.01 to 2.0 groups (d) per molecule.

The parent structure may additionally carry lateral reactive functional groups (e) which are able to undergo radically, ionically and/or thermally initiated crosslinking reactions with reactive functional groups (e) of their own kind or with other, complementary, functional groups (f). The complementary functional groups (e) and (f) may be present in one and the same parent structure, which is the case with what are known as self-crosslinking systems. Alternatively, the functional groups (f) may be present in another constituent, materially different from the solid of the invention, an example being a crosslinking agent, which is the case with what are known as externally crosslinking systems. For further details, refer to Römpp Lexikon Lacke und Druckfarben, Georg Thieme Verlag, Stuttgart, New York, 1998, "curing", pages 274 to 276. Reactive functional groups (e) and (f) are used in particular when the solid of the invention is to be curable with actinic radiation and thermally (dual cure). They are selected so as not to disrupt, let alone prevent entirely, the actinic radiation initiated polymerization or crosslinking reaction of the double bonds of the groups (a). However, it is possible to use reactive functional groups (e) and (f), which undergo addition onto olefinically unsaturated double bonds, in minor amounts—that is, in amounts which are not disruptive.

Examples of suitable complementary reactive functional groups (e) and (f) are disclosed in the following overview.
Overview: Complementary Reactive Functional Groups (e) and (f)

| (e) | and or | (f) |
|---|---|---|
| (f) | and | (e) |
| —SH | | —C(O)—OH |
| —NH$_2$ | | —C(O)—O—C(O)— |
| —OH | | —NCO |
| —O—(CO)—NH—(CO)—NH$_2$ | | —NH—C(O)—OR |
| —O—(CO)—NH$_2$ | | —CH$_2$—OH |
| | | —CH$_2$—O—CH$_3$ |
| | | —NH—C(O)—CH(—C(O)OR)$_2$ |
| | | —NH—C(O)—CH(—C(O)OR) |
| | | (—C(O)—R) |
| | | —NH—C(O)—NR$^1$R$^2$ |
| | | =Si(OR)$_2$ |
| | | O |
| | | —CH—CH$_2$ |
| —C(O)—OH | | O |
| | | —CH—CH$_2$ |
| —O—C(O)—CR=CH2 | | —OH |
| —O—CR=CH$_2$ | | —NH$_2$ |
| | | —C(O)—CH$_2$—C(O)—R |

In the overview, the variable R stands for an acyclic or cyclic aliphatic radical, an aromatic radical and/or an aromatic-aliphatic (araliphatic) radical; the variables R$^1$ and R$^2$ stand for identical or different aliphatic radicals or are linked with one another to form an aliphatic or heteroaliphatic ring. Where the reactive complementary groups (e) and/or (f) are used as well, they are present in the solid of the invention preferably in an amount corresponding to on average from 0.1 to 4 groups per molecule.

The preparation of the parent structures for inventive use has no special features in terms of its method but instead takes place by means of the customary and known synthesis methods of low molecular mass organic chemistry and/or of polymer chemistry. As far as the oligomeric and/or polymeric parent structures are concerned which are very particularly preferred in accordance with the invention and which are derived from polyesters, polyester-polyethers, polyurethanes and polyester-polyurethanes, but especially the polyurethanes and polyester-polyurethanes, the customary and known methods of polyaddition and/or polycondensation are employed.

As is known, the very particularly preferred polyurethanes and polyester-polyurethanes are prepared from polyols and diisocyanates and also, where appropriate, polyamines and amino alcohols. In this context, the polyols and diisocyanates and, where appropriate, the polyamines and amino alcohols are employed in molar proportions which result in hydroxyl-terminated or isocyanato-terminated polyurethanes or polyester-polyurethanes.

For the preparation of the polyurethanes and polyester-polyurethanes it is preferred to use diisocyanates and also, where appropriate, minor amounts of polyisocyanates for the purpose of introducing branching. For the purposes of the present invention, minor amounts are amounts which do not bring about gelling of the polyurethanes and polyester-polyurethanes during their preparation. Said gelling may also be prevented by using small amounts of monoisocyanates as well.

Examples of suitable diisocyanates are isophorone di-isocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethyl-cyclohexane, 1-isocyanato-2-(3-isocyanatoprop-1-yl)-cyclohexane, 1-isocyanato-2-(3-isocyanatoeth-1-yl)-cyclohexane, 1-isocyanato-2-(4-isocyanatobut-1-yl)-cyclohexane, 1,2-diisocyanatocyclobutane, 1,3-diiso-cyanatocyclobutane, 1,2-diisocyanatocyclopentane, 1,3-diisocyanatocyclopentane, 1,2-diisocyanatocyclo-hexane, 1,3-diisocyanatocyclohexane, 1,4-diisocyanato-cyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethyl-hexane diisocyanate, heptanemethylene diisocyanate or diisocyanates derived from dimer fatty acids, such as are sold under the commercial designation DDI 1410 by Henkel and described in the patents DO 97/49745 and WO 97/49747, especially 2-heptyl-3,4-bis(9-isocyanato-nonyl)-1-pentylcyclohexane, or 1,2-, 1,4- or 1,3-bis-(isocyanatomethyl)cyclohexane, 1,2-, 1,4- or 1,3-bis-(2-isocyanatoeth-1-yl)cyclohexane, 1,3-bis (3-iso-cyanatoprop-1-yl)cyclohexane, 1,2-, 1,4- or 1,3-bis-(4-isocyanatobut-1-yl)cyclohexane, liquid bis(4-isocyanatocyclohexyl)methane with a trans/trans content of up to 30% by weight, preferably 25% by weight, and in particular 20% by weight, as described by the patents DE-A-44 14 032, GB-A-1220717, DE-A-16 18 795 or DE-A-17 93 785; tolylene diisocyanate, xylylene diisocyanate, biphenylene diisocyanate, naphthylene diisocyanate or diphenylmethane diisocyanate.

Examples of suitable polyisocyanates are the isocyanurates of the above-described diisocyanates. Further examples of suitable polyisocyanates are polyurethane prepolymers containing isocyanate groups, which can be prepared by reacting polyols with an excess of polyisocyanates and are preferably of low viscosity. It is also possible to use polyisocyanates containing biuret, allophanate, iminooxadiazinedione, urethane, urea carbodiimide and/or uretdione groups. Polyisocyanates containing urethane groups, for example, are obtained by reacting some of the isocyanate groups with polyols, such as trimethylolpropane and glycerol, for example.

Examples of highly suitable monoisocyanates are phenyl isocyanate, cyclohexyl isocyanate or stearyl isocyanate.

Examples of suitable polyols are saturated and unsaturated polyols of high and low molecular mass, especially diols and, in minor amounts, triols or higher polyfunctional polyols for the purpose of introducing branches.

Examples of suitable polyols are saturated or olefinically unsaturated polyesterpolyols which are prepared by reacting
unsulfonated or sulfonated saturated and/or unsaturated polycarboxylic acids or their esteri-fiable derivatives, together if desired with mono-carboxylic acids, and also
saturated and/or unsaturated polyols, together if desired with monools.

Examples of suitable polycarboxylic acids are aromatic, aliphatic and cycloaliphatic polycarboxylic acids. Preference is given to using aromatic and/or aliphatic polycarboxylic acids.

Examples of suitable aromatic polycarboxylic acids are phthalic acid, isophthalic acid, terephthalic acid, phthalic, isophthalic or terephthalic monosulfonate, or halophthalic acids, such as tetrachloro- and/or tetrabromophthalic acid, of which isophthalic acid is dvantageous and is therefore used with preference.

Examples of suitable acyclic aliphatic or unsaturated polycarboxylic acids are malonic acid, succinic acid, glutaric acid, adipic acid, pimelic acid, suberic acid, azelaic acid, sebacic acid, undecanedicarboxylic acid or dodecanedicarboxylic acid or maleic acid, fumaric acid or itaconic. acid, of which adipic acid, glutaric acid, azelaic acid, sebacic acid, and maleic acid are advantageous and are therefore used with preference.

Examples of suitable cycloaliphatic and cyclic unsaturated polycarboxylic acids are 1,2-cyclobutane-dicarboxylic acid, 1,3-cyclobutane-dicarboxylic acid, 1,2-cyclopentane-dicarboxylic acid, 1,3-cyclopentane-dicarboxylic acid, hexahydrophthalic acid, 1,3-cyclo-hexanedicarboxylic acid, 1,4-cyclohexanedicarboxylic acid, 4-methylhexahydrophthalic acid, tricyclodecane-dicarboxylic acid, tetrahydrophthalic acid, endomethyl-enetetrahydrophthalic acid or 4-methyltetrahydro-phthalic acid. These dicarboxylic acids may be used both in their cis and in their trans form and also as a mixture of both forms.

Further examples of suitable polycarboxylic acids are polymeric fatty acids, especially those having a dimer content of more than 90% by weight, which are also referred to as dimer fatty acids.

Also suitable are the esterifiable derivatives of the bovementioned polycarboxylic acids, such as, for example, their monoesters or polyesters with aliphatic alcohols or polyols having from 1 to 4 carbon atoms. Moreover, it is also possible to use the anhydrides of the abovementioned poly-carboxylic acids, where they exist.

If desired it is possible, together with the poly-carboxylic acids, to use monocarboxylic acids too, such as benzoic acid, tert-butylbenzoic acid, caproic acid, caprylic acid, capric acid, lauric acid, palmitic or stearic acid, other fatty acids of naturally occurring oils, acrylic acid, methacrylic acid, ethacrylic acid, crotonic acid or the adduct of dicyclopentadiene and maleic anhydride in a molar ratio of 1:1.

Examples of suitable polyols are diols, triols, tetrols and sugar alcohols, but especially diols. Normally, the higher polyfunctional polyols are used alongside the diols in minor amounts in order to introduce branches into the polyester-polyols. For the purposes of the present invention, minor amounts are amounts which do not bring about gelling of the polyesterpolyols during their preparation.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl lycol, diethylene glycol, 1,2-, 1,3- or 1,4-cyclo-hexanediol, 1,2-, 1,3- or 1,4-cyclohexanedimethanol, trimethylpentanediol, ethylbutylpropanediol, bisphenol A, hydrogenated bisphenol A, or the positionally isomeric diethyloctanediols. These diols may also be used per se for the preparation of the polyurethanes (A) for inventive use.

Further examples of suitable diols are diols of the formula III or IV:

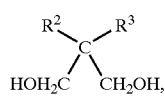

in which $R^2$ and $R^3$ each represent an identical or different radical and stand for an alkyl radical having from 1 to 18 carbon atoms, an aryl radical or a cycloaliphatic radical, with the proviso that $R^2$ and/or $R^3$ may not be methyl;

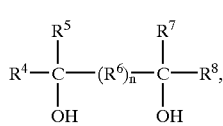

in which $R^4$, $R^5$, $R^7$ and $R^8$ each represent identical or different radicals and stand for an alkyl radical having from 1 to 6 carbon atoms, a cyclo-alkyl radical or an aryl radical and $R^6$ represents an alkanediyl radical having from 1 to 6 carbon atoms, an arylene radical or an unsaturated alkenediyl radical having from 1 to 6 carbon atoms, and n is either 0 or 1.

Suitable diols III of the general formula III are all propanediols of the formula in which either $R^2$ or $R^3$ or $R^2$ and $R^3$ is not equal to methyl, such as 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tert-butylpropane-1,3-diol, 2-butyl-2-propylpropane-1, 3-diol, 1-di-hydroxymethylbicyclo[2.2.1]heptane, 2,2-diethylpropane-1,3-diol, 2,2-dipropylpropane-1,3-diol or 2-cyclohexyl-2-methylpropane-1,3-diol and others, for example.

As diols IV of the general formula IV it is possible, for example, to use 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethyl-butane-2,3-diol, 1,4-(2'-hydroxypropyl)benzene and 1,3-(2'-hydroxypropyl)benzene.

The abovementioned diols may also be used per se for the preparation of the polyurethanes and polyester-polyurethanes.

Examples of suitable triols are trimethylolethane, trimethylolpropane or glycerol, especially trimethylol-propane.

Examples of suitable tetrols are pentaerythritol or homopentaerythritol.

Examples of suitable higher polyfunctional polyols are sugar alcohols such as threitol, erythritol, arabitol, adonitol, xylitol, sorbitol, mannitol or dulcitol.

The abovementioned higher polyfunctional polyols may also be used per se for the preparation of the polyurethanes and polyester-polyurethanes (cf. the patent EP-A-0 339 433).

If desired, minor amounts of monools may be used as well. Examples of suitable monools are alcohols or phenols such as ethanol, propanol, n-butanol, sec-butanol, tert-butanol, amyl alcohols, hexanols, fatty alcohols, allyl alcohol or phenol.

The polyesterpolyols may be prepared in the presence of small amounts of an appropriate solvent as entrainer. Entrainers used include, for example, aromatic hydrocarbons, such as particularly xylene and (cyclo)-aliphatic hydrocarbons, e.g., cyclohexane or methyl-cyclohexane.

Further examples of suitable polyols are hydroxyl-containing polybutadienes or polyurethanes.

Further examples of suitable polyols are polyesterdiols which are obtained by reacting a lactone with a diol. They are notable for the presence of terminal hydroxyl groups and repeating polyester units of the formula —(—CO—(CHR$^9$)$_m$—CH$_2$—O—)—. In this formula the index m is preferably from 4 to 6 and the substituent $R^9$=hydrogen, an alkyl, cycloalkyl or alkoxy radical. No one substituent contains more than 12 carbon atoms. The total number of carbon atoms in the substituent does not exceed 12 per lactone ring. Examples thereof are hydroxycaproic acid, hydroxybutyric acid, hydroxy-decanoic acid and/or hydroxystearic acid.

For the preparation of the polyesterdiols preference is given to the unsubstituted ###-caprolactone, in which m has the value 4 and all $R^9$ substituents are hydrogen. The reaction with lactone is started by low molecular mass polyols such as ethylene glycol, 1,3-propanediol, 1,4-butanediol or dimethylolcyclohexane. It is, however, also possible to react other reaction components, such as ethylenediamine, alkyldialkanolamines or else urea, with caprolactone. Further suitable high olecular mass diols include polylactamdiols, prepared by reacting, for example, ###-caprolactam with low molecular mass diols.

Examples of highly suitable aliphatic polyesterdiols of the type described above are the polycaprolactonediols which are sold under the brand name CAPAO by Solvay Interox.

Further examples of suitable polyols are polyether-polyols, especially those having a number-average molecular weight of from 400 to 5000, in particular from 400 to 3000. Highly suitable polyetherdiols are, for example, polyetherdiols of the general formula H—(O—(CHR$^{10}$)$_o$—)$_p$OH, in which the substituent $R^{10}$=hydrogen or is a lower, unsubstituted or substituted alkyl radical, the index o=2 to 6, preferably 3 to 4, and the index p=2 to 100, preferably 5 to 50. Cited as particularly suitable examples are linear or branched polyetherdiols such as poly(oxyethylene) glycols, poly(oxypropylene) glycols and poly-(oxybutylene) glycols.

These polyols as well may be used per se for the preparation of the polyurethanes or polyester-polyurethanes.

The polyurethanes and polyester-polyurethanes may be prepared using polyamines and amino alcohols, which bring about an increase in the molecular weight of the parent structure. In this case it is essential that the polyamines and amino alcohols are employed in an amount such that free isocyanate groups or hydroxyl groups still remain in the molecule.

Examples of suitable polyamines have at least two primary and/or secondary amino groups. Polyamines are essentially alkylenepolyamines having from 1 to 40 carbon atoms, preferably from about 2 to 15 carbon atoms. They may carry substituents which have no hydrogen atoms that are reactive with isocyanate groups. Examples are polyamines having a linear or branched aliphatic, cycloaliphatic or aromatic structure and containing at least two primary amino groups.

As diamines, mention may be made of hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane and aminoethyleneothanolamine. Preferred diamines are hydrazine, alkyl- or cycloalkyldiamines such as propylenediamine and 1-amino-3-aminomethyl-3,5,5-trimethylcyclohexane.

It is also possible to use polyamines which contain more than two amino groups in the molecule. In these ases, however, it must be ensured—for example, by sing monoamines as well—that crosslinked poly-rethane resins are not obtained. Polyamines of this kind which can be used are diethylenetriamine, tri-ethylenetetramine, dipropylene-diamine and dibutylene-triamine. An example to be mentioned of a monoamine is ethylhexylamine (cf. the patent EP-A-0 089 497).

Examples of suitable amino alcohols are ethanolamine, diethanolamine or triethanolamine.

The above-described groups (a) for inventive use are introduced using suitable starting products (a) as early as during the preparation of the parent structure or, following the preparation of the parent structure, by means of polymer-analogous reactions, thereby giving the solid of the invention.

It is essential to the invention that, in the course of the reaction of the starting products (a), the above-described linking urethane groups I and/or II are formed.

The selection of the starting products (a) is therefore guided in particular by whether (i) pendant and/or terminal isocyanate groups are present in the-parent structure and/or isocyanate groups are present in the other starting products for the parent structure, or (ii) pendant and/or terminal hydroxyl groups are present in the parent structure and/or hydroxyl groups are present in the other starting products for the parent structure.

In case (i), the starting products (a) contain a hydroxyl group which reacts with the free isocyanate groups of the parent structure and/or the isocyanate groups of the other starting products to give the linking urethane groups I.

In case (ii), the starting products (a) contain an isocyanate group which reacts with the hydroxyl groups of the parent structure and/or the hydroxyl groups of the other starting products to give the linking urethane groups II.

In a third variant, (iii), the starting products (a) already contain a ready-formed linking urethane group I or II. Furthermore, these starting products (a) contain at least two, in particular two, reactive functional groups which react with suitable reactive functional groups in further starting products to form the divalent functional groups (c). Examples of highly suitable reactive functional groups are the above-escribed complementary reactive functional groups (e) and (f), of which the hydroxyl groups and isocyanate groups are particularly advantageous and are used with very particular preference in accordance with the invention.

Examples of suitable starting products (a) for variant (i), accordingly, are customary and known monomers which carry at least one hydroxyl group per molecule, such as norbornenol, dicyclopentadienol, and isoprenyl, isopropenyl, allyl and/or butenyl alcohol;

2-hydroxyethyl, 2-hydroxypropyl, 3-hydroxypropyl, 3-hydroxybutyl, 4-hydroxybutyl, bis(hydroxy-methyl) cyclohexane, neopentyl glycol, diethylene glycol, dipropylene glycol, dibutylene glycol, and triethylene glycol acrylate, methacrylate, ethacrylate, crotonate, cinnamate, vinyl ether, allyl ether, isoprenyl ether, isopropenyl ether or butenyl ether;

trimethylolpropane di-, glycerol di-, trimethylol-ethane di-, pentaerythritol tri- or homopenta-erythritol triacrylate, -methacrylate, -ethacrylate, -crotonate, -cinnamate, -vinyl ether, -allyl ether, -isoprenyl ether, -isopropenyl ether or -butenyl ether; or reaction products of cyclic esters, such as epsilon-caprolactone, for example, and the above-described hydroxyl-containing monomers.

Of these, the acrylates, especially 2-hydroxyethyl, 2-hydroxypropyl, 3-hydroxypropyl, 3-hydroxybutyl, and 4-hydroxybutyl acrylate, particularly 2-hydroxyethyl acrylate, are of particular advantage and are therefore used with very particular preference in accordance with the invention.

Examples of suitable starting products (a) for variant (ii) are the adducts of the below-described diisocyanates, preferably the linear diisocyanates, with compounds which contain an isocyanate-reactive group, preferably one of the above-described functional groups (e) or (f), in particular a hydroxyl group, and also at least one of the above-described groups (a), especially acrylate groups;

in a molar ratio of from 0.8:1 to 1.2:1, especially 1:1.

Examples of especially suitable starting products (a) for variant (ii) are the adducts of hexamethylene diisocyanate or isophorone diisocyanate with 2-hydroxy-ethyl acrylate in a molar ratio of 1:1.

Examples of suitable starting products (a) for variant (iii) are the reaction products of the above-described adducts in a molar ratio of 1:1 of diisocyanates and compounds which contain at least one isocyanate-reactive group and at least one group (a), with trifunctional groups which contain at least one, in particular three, isocyanate-reactive groups, especially hydroxyl groups, in a molar ratio of 1:1.

Examples of highly suitable reaction products of this kind are the reaction products of the adducts of hexamethylene diisocyanate or isophorone diisocyanate with 2-hydroxyethyl acrylate in a molar ratio of 1:1 with trimethylolpropane in a molar ratio of 1:1.

Further examples of suitable starting products (a) for variant (iii) are the reaction products of triisocyanates, especially isocyanurates of the below-described diisocyanates, with compounds which contain an isocyanate-reactive group (e) or (f), in particular a hydroxyl group, and also at least one, especially one, of the above-described groups (a), in a molar ratio of 1:1.

Examples of highly suitable reaction products of this kind are the reaction products of the isocyanurates of hexamethylene diisocyanate or isophorone diisocyanate with 2-hydroxyethyl acrylate in a molar ratio of 1:1.

For the incorporation of the chemically bonded photoinitiators and/or photocoinitiators (d) and also of the complementary reactive functional groups (e) and (f) it is advantageous to use starting products (d), (e) and (f) which contain the groups or radicals in question and also, in particular, hydroxyl groups or isocyanate groups.

Preference is given to employing variants (i) and (ii) with the corresponding starting products (a), with variant (i) being more preferred. Further advantages arise here if the corresponding starting products (a) are used during the actual preparation of the parent structure, and so this variant is employed with very particular preference.

A particularly advantageous solid of the invention contains not only the above-described groups (a) and also, where appropriate, (c), (d), (e) and/or (f) but also from 0.01 to 1.0 mol %, prfeferably from 0.02 to 0.9 mol %, more preferably from 0.03 to 0.85 mol %, with particular preference from 0.04 to 0.8 mol %, with very particular preference from 0.05 to 0.75 mol %, and in particular from 0.06 to 0.7 mol %, based in each case on the double bonds present in the solid of the invention, and at least one chemically bonded stabilizer (b).

In this context the particularly advantageous solid of the invention contains on average per molecule more than one, preferably more than 1.3, more preferably more than 1.5, with particular preference more than 1.6, with very particular preference more than 1.8, and in particular more than 2 groups (a) per molecule. The groups (a) employed are identical or different and are attached to the parent structure of the solid of the invention in the manner described above.

The chemically bonded stabilizer (b) comprises compounds which are, or which donate, sterically hindered nitroxyl radicals (>N—O•) which scavenge free radicals in the modified Denisov cycle.

Examples of suitable chemically bonded stabilizers (b) are HALS compounds, preferably 2,2,6,6-tetralkylpiperidine derivatives, especially 2,2,6, 6-tetramethylpiperidine derivatives, whose nitrogen atom is substituted by an oxygen atom, an alkyl group, alkylcarbonyl group or alkyl ether group. For further details, refer to the textbook "Lackadditivem" [Additives for coatings] by Johan Bieleman, Wiley-VCH, Weinheim, New York, 1998, pages 293 to 295.

Examples of suitable starting products (b) for introducing the chemically bonded stabilizers (b) are HALS compounds, preferably 2,2,6,6-tetraalkylpiperidine derivatives, particularly 2,2,6,6-tetramethylpiperidine derivatives, whose nitrogen atom is substituted by an oxygen atom, an alkyl group, an alkylcarbonyl group or an alkyl ether group, and which contain an isocyanate group or an isocyanate-reactive functional group (e) or (f), particularly a hydroxyl group. One example of an especially suitable starting product (b) is the nitroxyl radical 2,2,6,6-tetramethyl-4-hydroxy-piperidine N-oxide.

The particularly advantageous solid of the invention may be prepared from the above-described starting products (a) and (b) and the starting products for the parent structure and also, where appropriate, the starting products (c), (d), (e) and/or (f) in a customary and known manner in solution. It is, however, further particular advantage of the particularly dvantageous solid of the invention that it may be prepared in the melt without problems, thereby removing the need to dispose of organic solvents.

The solid of the invention is amorphous, partly crystalline, or crystalline. Preferably it is partly crystalline or crystalline, since this gives it blocking resistance and ready grindability even at low molecular weights, particularly in the oligomer range, especially from 500 to 5000 daltons, and means that it produces a low-viscosity melt. It is further of advantage if it has a narrow molecular weight distribution, since this again has a beneficial effect on the blocking resistance and the melt viscosity. The degree of crystallinity and the molecular weight distribution can be adjusted by customary and known methods, and so the skilled worker can adjust them simply with the assistance, where appropriate, of simple preliminary tests.

The solid of the invention preferably has a melting range or melting point in the temperature range from 40 to 130° C. Its melt viscosity at 130° C. is preferably from 50 to 20 000 mPas.

The solid of the invention may be used as an adhesive or sealing compound or to produce adhesives and sealing compounds. Said adhesives and sealing compounds of the invention then include effective amounts of at least one additive such as is commonly used in the field of hotmelt adhesives and of sealing compounds.

The solid of the invention is advantageously employed as a coating material or for preparing coating materials, preferably solid coating materials, and in particular powder coating materials.

Accordingly, the solid of the invention is present in the powder coating material of the invention preferably in an amount of from 50 to 100%, more preferably from 50 to 98%, with particular preference from 55 to 95%, with very particular preference from 55 to 90% by weight, based in each case on the powder coating material of the invention.

The powder coating materials of the invention based on at least one solid of the invention are curable thermally and/or with actinic radiation. In the case of the combination of thermal curing and curing with actinic radiation, the term "dual cure" is also used.

The composition of the powder coating materials of the invention may be varied very widely, which is a very important advantage. The composition is guided on the one hand by the curing method or methods that is or are to be used and on the other hand by the intended use of the powder coating materials (pigment-free clearcoat material or pigmented color and/or effect paint).

Examples of suitable further constituents for use in the powder coating materials of the invention are oligomers and/or polymers which are curable thermally and/or with actinic radiation and which have a glass transition temperature, Tg, of above 40° C., such as thermally and/or actinic radiation curable linear and/or branched and/or block, comb and/or random poly(meth)acrylates or acrylate copolymers, polyesters, alkyds, polyurethanes, acrylated polyurethanes, acrylated polyesters, polylactones, polycarbonates, polyethers, epoxy resin-amine adducts, (meth)acrylate-diols, partially hydrolyzed polyvinyl esters or polyureas, or actinic radiation curable (meth)acryloyl-functional (meth)acrylate copolymers, polyether acrylates, polyester acrylates, unsaturated polyesters, epoxy acrylates, urethane acrylates, amino acrylates, melamine acrylates, silicone acrylates, and the corresponding methacrylates, but especially polyesters.

Of advantage are solid amorphous, partly crystalline and/or crystalline polyesters which contain terminal groups, formed by the adduct of dicyclopentadiene and maleic anhydride in a molar ratio of 1:1, and/or chain-positioned endomethylenetetrahydrophthalic acid groups. The preparation of these polyesters is customary and known and may be carried out using the starting products described above in connection with the preparation of the polyester-polyurethanes. If they are used as well, they are present in the powder coating materials of the invention in an amount, based on the powder coating material, of from 2.0 to 50%, preferably from 5.0 to 45%, more preferably from 10 to 45%, with particular preference from 15 to 40%, with very particular preference from 15 to 38%, and in particular from 15 to 35% by weight.

Furthermore, the powder coating materials of the invention may comprise customary coatings additives. Examples of suitable customary coatings additives for use in the powder coating materials of the invention are customary and known reactive diluents curable thermally and/or with actinic radiation, such as positionally isomeric diethyloctanediols or hydroxyl-containing hyperbranched compounds or dendrimers, (meth)acrylates with a functionality of two or more, such as trimethylolpropane tri(meth)acrylate, or polyisocyanates containing (meth)acrylate groups;

crosslinking agents containing the above-described functional groups (e) and/or (f), such as amino resins, compounds or resins containing anhydride groups, compounds or resins containing epoxide groups, tris(alkoxycarbonylamino)triazines, compounds or resins containing carbonate groups, blocked and/or unblocked polyisocyanates, beta-hydroxyalkylamides, and also compounds containing on average at least two transesterifiable groups, examples being reaction products of malonic diesters and polyisocyanates or of esters and partial esters of polyhydric alcohols of malonic acid with monoisocyanates, as are described in the European patent EP-A-0 596 460;

UV absorbers;

light stabilizers such as HALS compounds, benzotriazoles or oxalanilides;

free-radical scavengers;

thermolabile free-radical initiators such as organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ethers;

crosslinking catalysts such as dibutyltin dilaurate, lithium decanoate or zinc octoate;

devolatilizers such as diazadicycloundecane or benzoin;

photoinitiators which are not bonded chemically, such as those of the Norrish 11 type whose mechanism of action is based on an intramolecular variant of the hydrogen abstraction reactions such as occur diversely in photochemical reactions (by way of example, refer here to Römpp Chemnie Lexikon, 9th expanded and revised edition, Georg Thieme Verlag Stuttgart, Vol. 4, 1991) or cationic photoinitiators (by way of example, refer here to Römpp Lexikon Lacke und Druckfarben, Georg Thieme Verlag Stuttgart, 1998, pages 444 to 446), especially benzophenones, benzoins or benzoin ethers or phosphine oxides;

slip additives;

polymerization inhibitors;

adhesion promoters such as tricyclodecane-dimethanol;

leveling agents; transparent fillers based on silica, alumuina, titanium dioxide or zirconium oxide; for further details, refer to Römpp Lexikon Lacke und Druckfarben, Georg Thieme Verlag, Stuttgart, 1998, pages 250 to 252;

flame retardants;

flatting agents such as magnesium stearate;

electrically conductive pigments, such as metal pigments, conductivity blacks, doped pearlescent pigments or conductive barium sulfate. Especially suitable electrically conductive pigments are the conductivity blacks; for further details, refer to Römpp Lexikon Lacke und Druckfarben, Georg Thieme Verlag, Stuttgart, New York., 1998, "metal pigments", p. 381, and "conductive pigments", p. 354;

effect pigments, such as metal flake pigments such as commercial aluminum bronzes, aluminum bronzes chromated in accordance with DE-A-36 36 183, and commercial stainless steel bronzes, and also nonmetallic effect pigments such as, for example, pearlescent and interference pigments; for further details, refer to Römpp Lexikon Lacke und Druckfarben, Georg Thieme Verlag, 1998, pages 176, "effect pigments" and pages 380 and 381, "metal oxide-mica pigments" to "metal pigments";

inorganic color pigments such as titanium dioxide, iron oxides, Sicotrans yellow and carbon black or organic color pigments such as thioindigo pigments indanthrene blue, Cromophthal red, Irgazine orange, and Heliogen green; for further details, refer to Römpp Lexikon Lacke und Druckfarben, Georg Thieme Varlag, 1998, pages 180 and 181, "iron blue pigments" to "black iron oxide", pages 451 to 453 "pigments" to "pigment volume concentration", page 563, "thioindigo pigments", and page 567 "titanium dioxide pigments", or organic and inorganic fillers such as chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers or wood flour; for further details, refer to Römpp Lexikon Lacke und Druckfarben, Georg Thieme Verlag, 1998, pages 250 ff., "fillers".

Further examples of suitable coatings additives are described in the textbook "Lackadditive" [Additives for coatings] by Johan Bieleman, Wiley-VCH, Weinheim, New York, 1998.

These additives are added to the powder coating materials of the invention in customary and known, effective amounts, which depending on additive may be from 0.001 to 500 parts by weight per 100 parts by eight of solid of the invention.

The preparation of the powder coating materials of the invention has no special features in terms of its method but instead takes place in a customary and known manner, preferably by mixing the constituents in the melt, by extrusion or kneading, discharging the melt from the mixer, solidifying the resulting homogenized mass, comminuting the mass until the desired particle size is obtained, and, where appropriate, classifying the resulting powder coating material of the invention under conditions which do not entail any premature thermal crosslinking and/or crosslinking with actinic radiation and/or other damage to individual constituents of the powder coating material of the invention as a result, for example, of thermal degradation.

In this context it is found to be a further particular advantage of the powder coating material of the invention that it can be dispersed in water to give a powder slurry coating material of the invention.

Nor does the application of the powder coating material of the invention have any special features in terms of its method; instead, it takes place by means of customary and known methods and apparatus, by electrostatic spraying, for example, again using conditions which do not entail any premature thermal crosslinking and/or crosslinking with actinic radiation and/or other damage to individual constituents of the powder coating material of the invention as a result, for example, of thermal degradation.

Instead, the powder slurry coating material of the invention may be applied using methods and apparatus such as are commonly employed for the application of spray coating materials.

The powder coating material of the invention and the powder slurry coating material of the invention may be applied in a wide variety of coat thicknesses, to give coatings of a wide variety of thicknesses, in particular from 10 to 250 μm. The thickness of the coatings is guided by the intended use thereof and may therefore be adjusted readily by the skilled worker.

The curing of the applied powder coating films also has no special features in terms of its method but is instead carried out using the customary and known methods and apparatus.

Accordingly, curing with actinic radiation may be carried out using electromagnetic radiation such as X-rays, Uw radiation, visible light or near IR (NIR) light or using corpuscular radiation such as electron beams. Methods and apparatus for curing with actinic radiation are customary and known and are described, for example, in R. Holmes, "U.V. and E.B. Curing formulations for Printing Inkst", Coatings and Paints, SITA Technology, Academic Press, London, United Kingdom 1984.

Thermal curing likewise has no special features in terms of its method but instead takes place in accordance with the customary and known methods such as heating in a forced air oven or irradiation using IR lamps.

Suitable coating substrates include all surfaces of articles which are amenable to curing of the coating films present thereon using heat and/or actinic radiation; examples include articles made of metals, plastics, wood, ceramic, stone, textile, fiber composites, leather, glass, glass fibers, glass wool and rock wool or mineral-bound and resin-bound building materials, such as plasterboard, cement slabs or roof shingles. Accordingly, the powder coating material or powder slurry coating material of the invention, particularly as a clearcoat, is highly suitable for applications in automotive finishing, the coating of furniture and. industrial coating, including coil coating, container coating, and the coating of electrical components. In the context of industrial coatings it is suitable for coating virtually all parts for private or industrial use such as radiators, domestic appliances, small metal parts, hubcaps, wheel rims or windings of electric motors.

In particular, the clearcoat of the invention is suitable as an overcoat for basecoats, preferably in the automobile industry. It is especially suitable as a clearcoat over aqueous basecoats based on polyesters, polyurethane resins, and amino resins.

The metallic substrates employed in this context may have a primer system, in particular a cathodically or anodically deposited and thermally cured electrocoat. Where appropriate, the electrocoat may also have been coated with an antistonechip primer or with a surfacer.

The powder coating material and powder slurry coating material of the invention may also be used in particular to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations to DIN 772BT1). The plastics to be coated may of course also be polymer blends, modified plastics or fiber-reinforced plastics. It is also possible to employ the lastics commonly used in vehicle construction, specially motor vehicle construction.

Nonfunctionalized and/or apolar substrate surfaces may be subjected prior to coating in a known manner to a pretreatment with a plasma or by flaming and/or may be coated with a water-based primer system made from a hydroprimer.

Particular advantages result if the adhesive films seals, and coatings of the invention are produced by means of the p roc ess of the invention.

For this purpose, (1) at least one coating material and/or adhesive and/or sealing compound of the invention in the form of
  (1.1) a melt,
  (1.2) a powder,
  (1.3) a powder slurry or
  (1.4) a d isp ersion or a solution in at Ieast one org anic sol vent
is applied to the above-described primed or unprimned substrate, (2) the resulting powder slurry film (1.3) or the resulting film of a dispersion or a solution (1.4) is dried or the resulting film of the melt (1.1) is caused to solidify or is maintained in the melted state by heating, (3) the resulting solid film (1.2), (1.3) or (1.4) is melted by heating, and (4) the melted film which results in process step (2) or (3),
  (4.1) in the melted state,
  (4.2) on solidification and/or
  (4.3) after solidification,
is cured with actinic radiation.

Where the coating materials, sealing compounds, and adhesives have an appropriate composition, curing with actinic radiation may be supplemented by thermal curing carried out before, during or after process step (4).

The adhesive films and seals produced from the adhesives and sealing compounds of the invention have outstanding bond strength and sealing capacity even under extreme climatic conditions and even over long periods of time.

The coatings of the invention produced from the powder coating materials and powder slurry coating materials of the invention exhibit outstanding leveling and have an outstanding overall appearance. They are stable to weathering and do not yellow even under tropical conditions. Accordingly, they can be used for numerous applications both inside and out. Primed and unprimed substrates, especially bodies of automobiles and commercial vehicles, industrial components, including plastics parts, packaging, coils and electrical components, or furniture coated with at least one coating of the invention therefore also have particular technical and economic advantages, especially a long service life, which makes them particularly attractive to users.

EXAMPLES AND COMPARATIVE TESTS

Preparation Example 1

The Preparation of an Adduct of Dicyclopentadiene and Malseic Anhydride

A stirred flask with heating and reflux condenser was charged with 661.10 g of dicyclopentadiene (5.0 mol) and 490.30 g of maleic anhydride (5.0 mol). The reaction mixture was heated to 125° C. under a gentle stream of nitrogen, after which 95.00 g of water (5.0 mol+5 g) were added from a dropping funnel over the course of one hour. The mixture was left to react at 125° C. for one hour more. This gave the following monocarboxylic acid:

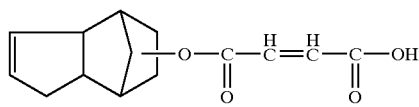

Preparation Example 2

The Preparation of an Unsaturated Polyester for Use in the Inventive Powder Coating Materials A stirred flask with heating and top-mounted distillation attachment was charged with 240.00 g of perhydrogenated bisphenol A (1 mol), 236.00 g of hexane-1,6-diol (2 mol), 194.00 g of dimethyl terephthalate (1 mol), and 0.67 g of tin acetate.

The resulting mixture was heated rapidly to 120° C. under a gentle stream of nitrogen. Then the temperature was raised in stages to 190° C. over the course of 3 hours, with the water of condensation formed being removed by distillation. Thereafter, the contents of the flask were cooled to 90° C. and the following were added to the reaction mixture:

516.80 g of adduct from preparation example 1 (2 mol),
116.00 g of fumaric acid (1 mol),
4.00 g of dibutyltin dilaurate, and
0.50 g of hydroquinone.

The resulting reaction mixture was heated rapidly to 130° C. under a gentle stream of nitrogen. Then its temperature was raised gradually to 190° C. over the course of 6 hours, with the water of condensation formed being removed by distillation. This gave a resin having an acid number of 17 which solidifies on cooling and, after grinding, gives non-caking powders.

Preparation Example 3

The Preparation of an Inventive Solid for Use in the Inventive Powder Coating Materials An appropriate reaction vessel, equipped with stirrer, reflux condenser, heating and inert gas supply, was charged with 14.76 g of trimethylolpropane,
236.36 g of hexane-1,6-diol,
197.2 g of hydroxyethyl acrylate, and
0.56 g of 2,2,6,6-tetramethyl-4-hydroxypiperidine N-oxide and this initial charge was heated to 60° C. 666 g of isophorone diisocyanate (IPDI) and 1.1 g of dibutyltin dilaurate were metered into the initial charge over the course of one hour. As a result of the exothermic reaction, the temperature rose slowly to 100° C. The esulting reaction mixture was left to react at 100° C. or 30 minutes more, so that free isocyanate groups ere no longer detectable. The melt was poured out onto aluminum foil and left to cool. This gave a hard, readily grindable resin. Data on the melt viscosity and melt stability can be found in table 1.

Preparation Example 4

The Preparation of a Noninventive Solid for Use in a Noninventive Powder Coating Material Inventive preparation example 3 was repeated but without the use of a chemically bonded HALS compound. Data on the melt viscosity and melt stability can be found in table 1.

Preparation Example 5

The Preparation of an Inventive Solid for Use in the Inventive Powder Coating Materials Inventive preparation example 3 was repeated except that, instead of the starting products used therein, the following starting products were used:

Initial charge: 62 g of ethylene glycol (1 mol),
45 g of butane-1,4-diol (0.5 mol),
232 g of hydroxyethyl acrylate (2 mol), and
0.4 g of 2,2,6,6-tetramethyl-4-hydroxypiperidine N-oxide.

Feed: 420.5 g of hexamethylene diisocyanate (2.5 mol) and 1 g of dibutyltin dilaurate.

Data on the melt viscosity and melt stability can be found in table 1.

Preparation Example 6

The Preparation of an Inventive Solid for Use in Noninventive Powder Coating Materials Inventive preparation example 5 was repeated but without the use of a chemically bonded HALS compound. Data on the melt viscosity and melt stability can be found in table 1.

Preparation Example 7

The Preparation of an Inventive Solid for Use in the Inventive Powder Coating Materials Inventive preparation example 3 was repeated except that, instead of the starting products used therein, the following starting products were used:

Initial charge: 66.2 g of ethylene glycol,
146.6 g of polycaprolactone (Capa 200 from Solvay Interox),
154.66 g of hydroxyethyl acrylate, and
0.4 g of 2,2,6,6-tetramethyl-5 4-hydroxypiperidine N-oxide.

Feed: 444 g of isophorone diisocyanate and
0.8 g of dibutyltin dilaurate.

Data on the melt viscosity and melt stability can be found in table 1.

Preparation Example 8

The Preparation of a Noninventive Solid for Use in Noninventive Powder Coating Materials Inventive preparation example 7 was repeated but without the use of a chemically bonded HALS compound. Data on the melt viscosity and melt stability can be found in table 1.

Table 1: The melt viscosity and the melt stability of the inventive (preparation eazles 3, 5 and 7) and noninventive (preparation examples 4, 6 and B) solids

| Preparation example | 3 | 4 | 5 | 6 | 7 | 8 |
|---|---|---|---|---|---|---|
| Melt visocsity: | | | | | | |
| [mPas/120° C.] | 11200 | 12300 | 750 | 810 | 3210 | 3400 |
| [mPas/130° C.] | 7050 | 8200 | 410 | 460 | 3120 | 2200 |
| Melt stability: | | | | | | |
| [min./130° C.] | >60 | about 12 | >60 | about 4 | >60 | about 6 |
| [min./140° C.] | >60 | about 4 | >60 | about 2 | >60 | about 3 |

The inventive and noninventive solids were characterized with a Physica Rheometer using a plate/plate system. The melt stability is the time taken for the melt viscosity to triple. A comparison of the figures in table 1 demonstrates that the solids of the invention were clearly more stable in the melt than the noninventive solids.

Examples 1 to 6 and Comparative Tests C1 to C6

The Production and Testing of the Inventive (Examples 1 to 6) and Noninventive (Comparative Tests C1 to C6) Powder Coatings For examples 1 and 2, the inventive solid from preparation example 3 was used.

For examples 3 and 4, the inventive solid from preparation example 5 was used.

For examples 5 and 6, the inventive solid from preparation example 7 was used.

For comparative tests C1 and C2, the noninventive solid from preparation example 4 was used.

For comparative tests C3 and C4, the noninventive solid from preparation example 6 was used.

For comparative tests C5 and C6, the noninventive solid from preparation example 8 was used.

Based on the respective powder coating material, 3% by weight of Darocure® 2959 (photoinitiator), 0.5% by weight of Modaflow® (leveling assistant), 1% by weight of benzoin (devolatilizing aid) were added to all of the inventive and noninventive powder coating materials. In all powder coating materials, moreover, the olefinically unsaturated polyester from preparation example 2 was used in the proportions specified in table 3.

The inventive and noninventive powder coatings were produced by the following general procedure:

The respective powder coating composition was melted in an oil bath at 140° C., poured onto an aluminum panel, ground after solidification, and scattered through a sieve onto a degreased steel panel to give a coating layer approximately 70 μm thick. The scattered powder coating layer was melted on a regulated hotplate at 140° C. for 5 minutes. Mounted at a distance of 30 cm above the hotplate was a mercury vapor lamp having an emission maximum at about 360 nm (Hönle LTV 400), which was closed off with a slide plate. After the powder coating layer had melted, the slide plate was opened and the melt was exposed for 30 seconds. The plate was then closed again and the panel was removed from the hotplate. The powder coating was tested after storage at room temperature for 24 hours.

Table 3 gives an overview of the proportions of inventive or noninventive solid to olefinically unsaturated polyester from preparation example 2, the tests conducted, and the results obtained.

Comparison of the results in table 3 shows that the inventive powder coatings in melt stability and leveling were superior to their conventional counterparts.

Where it was possible at all to produce the conventional powder coatings, they were predominantly inferior in deformability to the inventive powder coatings. Furthermore, owing to the poorer leveling, they had a poorer surface quality and hence a poorer overall appearance.

What is claimed is:

1. A solid containing
   a) on average per molecule at least two groups (a) having at least one bond which can be activated with actinic radiation whereby the groups (a) are structurally different from one another and are attached to the parent structure of the solid via urethane groups and
   b) from 0.01 to 1 mol %, based on the double bonds present of at least one chemically bonded stabilizer, obtained by reaction in the melt.

2. The solid as claimed in claim 1, characterized in that the bonds which can be activated with actinic radiation comprise carbon-hydrogen single bonds or carbon-carbon, carbon-oxygen, carbon-nitrogen, carbon-phosphorus or carbon-silicon single bonds or double bonds.

3. The solid as claimed in claim 1, characterized in that at least one HALS compounds containing at least on isocyanate-reactive group is used as starting product for introducing the chemically bonded polymerization stabilizer (b).

4. The solid as claimed in claim 1, characterized in that the groups (a) are selected from the group containing (meth)acrylate, ethacrylate, crotonate, cinnamate, vinyl ether, vinyl ester, dicyclopentadienyl, norbomenyl, isoprenyl, isoprenyl, isoprepenyl, allyl or butenyl groups; dicyclopentadienyl

TABLE 3

Performance properties of the inventive (examples 3, 5 and 7) and noninventive (comparative test C4, C6 and C8) powder coatings

| Example/ comparative test no. | Ratio polyester-/ solid (parts by weight) | Leveling visual (rating[a]) | Erichsen value[b] | Cross-cut (rating[c]) | Pendulum hardness[d] (s) | Pencil hardness | MEK[e] |
|---|---|---|---|---|---|---|---|
| 1 | 20/80 | 2 | 7.2 | GT2 | 187 | 4H | 0 |
| 2 | 30/70 | 2 | 6.4 | GT1 | 194 | 5H | 0 |
| C1 | 20/80 | 3 | 6.9 | GT2 | 191 | 4H | 0 |
| C2 | 30/70 | | crosslinks when melted in test tube | | | | |
| 3 | 20/80 | 2 | 3.6 | GT2 | 181 | 5H | 0 |
| 4 | 30/70 | 2 | 2.8 | GT3 | 193 | 5H | 0 |
| C3 | 20/80 | | crosslinks when melted in test tube | | | | |
| C4 | 30/70 | 4 | 3.5 | GT3 | 192 | 5H | 0 |
| 5 | 20/80 | 1 | 8.4 | GT0 | 161 | 3H | 0 |
| 6 | 30/70 | 1 | 7.6 | GT0 | 177 | 4H | 0 |
| C5 | 20/80 | 1 | 8.2 | GT0 | 168 | 3H | 0 |
| C6 | 30/70 | 2 | 5.7 | GT1 | 184 | 4H | 0 | a) Rating: 1 = very good; 2 good; 3 = still just usable; 4 = no longer sufficient for high quality requirements;

b) Erichsen cupping in accordance with DIN EN ISO 1520: 1995-04;

c) Cross-cut testing in accordance with DIN ISO 2409: 1994-10;

d) Pendulum attenuation testing in accordance with DIN 53157: 1987-01;

e) 60 double strokes with a cotton pad soaked with methyl ethyl ketone ether, norbornenyl ether, isoprenyl ether, isopropenyl ether, allyl ether or butenyl ether groups, or dicyclopentadienyl ester, norbomenyl ester, isoprenyl ester, isoprepenyl ester, allyl ester or butenyl ester groups.

5. The solid as claimed in claim 4, characterized in that it contains at least one (meth)acrylate group and at least one group (a) selected from the group containing ethacrylate, crotonate, cinnamate, vinyl ether, vinyl ester, dicyclopentadienyl, norbomenyl, isoprenyl, isopropenyl, ally and butenyl groups; isoprenyl ether, isopropenyl ether, allyl ether and butenyl ether groups, and also isoprenyl ester, isopropenyl ester, allyl ester and butenyl ester groups.

6. The solid as claimed in claim 1, characterized in that it comprises chemically bonded photoinitiators and/or photocoinitiators.

7. The solid as claimed in claim 1, characterized in that it contains functional groups (e) which are able to undergo thermal crosslinking reactions with groups (e) of their own kind and/or with complementary functional groups (f).

8. The solid as claimed in claim 1, characterized in that it is amorphous, partly crystalline, or crystalline.

9. The solid as claimed in claim 1, characterized in that it has a melting range or melting point in the temperature range from 40 to 130° C.

10. The solid as claimed in claim 1, characterized in that it has a melt viscosity at 130° of from 50 to 20 000 mPas.

11. The solid as claimed in claim 1, characterized in that its parent structure is of low molecular mass, oligomeric and/or polymeric.

12. The solid as claimed in claim 11, characterized in that the oligomeric andlor polymeric parent structure contains olefinically unsaturated double bonds.

13. The solid as claimed in claim 11, characterized in that the oligomeric and/or polymeric parent structure is derived from random, alternating and/or block, linear, branched, hyperbranched, dendrimeric and/or comb poly-addition resins, polycondensation resins and/or addition (co) polymers of ethylenically unsaturated monomer.

14. The solid as claimed in claim 13, characterized in that the addition (co)polymers are poly-(meth)acrylates and/or partially hydrolyzed polyvinyl esters and the polyaddition resins and/or polycondensation resins are polyesters, alkyds, polyurethanes, polyester-polyurethanes, polylactones, polycarbonates, polyethers, poly-ether-polyesters, epoxy resin-amine adducts, polyureas, polyamides or polyimides.

15. Coating materials, adhesives or sealing compounds comprising at least one solid as claimed in claim 1.

16. The coating materials, adhesives or sealing compounds as claimed in claim 15, characterized in that at least one further constituent curable with actinic radiation is present therein.

17. The coating materials, adhesives or sealing compounds as claimed in claim 16, characterized in that the further constituent is selected from the group containing (meth)acryloyl-functional (meth)acrylic copolymers, polyether acrylates, polyester acrylates, unsaturated polyesters, epoxy acrylates, amino acrylates, melamine acrylates, silicone acrylates, and the corresponding methacrylates.

18. The coating materials, adhesives or sealing compounds as claimed in claim 15, characterized in that at least one further additive is present therein.

19. The coating materials, adhesives or sealing compounds as claimed in claim 15, characterized in that at least one further additive is present therein.

20. The coating materials, adhesives or sealing compounds as claimed in claim 15, characterized in that they are present as powders, powder slurries, or in solution or dispersion in organic solvents.

21. A process for producing coatings, adhesive films or seals for primed or unprimed substrates, wherein
(1) at least one coatingrnaterial and/or adhesive and/or sealing compound as claimed in claim 15, in the form of
(1.1) a melt,
(1.2) a powder,
(1.3) a powder slurry or
(1.4) a dispersion or a solution in at least one organic solvent is applied to the primed or unprimed substrate,
(2) the resulting powder slurry film (1.3) or the resulting film of a dispersion or a solution (1.4) is dried or the resulting film of the melt (1.1) is caused to solidify or is maintained in the melted state by heating,
(3) the resulting solid film (1.2), (1.3) or (1.4) is melted by heating, and
(4) the melted film which results in process step (2) or (3),
(4.1) in the melted state,
(4.2) on solidification and/or
(4.3) after solidification,
is cured with actinic radiation.

22. The process as claimed in claim 21, characterized in that the film is thermally cured by heating during or after process step (4).

23. The process as claimed in claim 21, characterized in that heating is carried out with near infrared (NIR) light.

24. Coatings, adhesive films or seals on primed or unprimed. substrates, produced by the process as claimed in claim 21.

25. Primed and unprimed substrates comprising at least one coating, at least one adhesive film and/or at least one seal as claimed in claim 24.

26. The solid claim 2, wherein the bonds are carbon-carbon double bonds.

27. The solid claim 5, wherein the (meth)acrylate group is an acrylate group.

28. The solid claim 14, wherein the polyaddition resins and/or polycondensation are polyesters, polyester-polyethers, polyurethanes or polyester-polyurethanes.

29. The primed and unprimed substrates of claim 25, which are bodies of automobile and commercial vehicles, industrial components, plastic parts, packaging, coil, electrical components or furniture.

30. The solid of claim 1, wherein the parent structure is an oligomer and/or a polymer.

* * * * *

UNITED STATES PATENT AND TRADEMARK OFFICE
CERTIFICATE OF CORRECTION

PATENT NO. : 6,825,241 B1  
DATED : November 30, 2004  
INVENTOR(S) : Blum et al.

It is certified that error appears in the above-identified patent and that said Letters Patent is hereby corrected as shown below:

<u>Title page,</u>  
Item [22], PCT Filed, should be -- October 2, 2000 --

Signed and Sealed this

Twelfth Day of April, 2005

JON W. DUDAS  
*Director of the United States Patent and Trademark Office*